Jan. 15, 1929.
M. HENDERSON
1,698,883
TIRE WORKING TOOL
Filed March 28, 1927
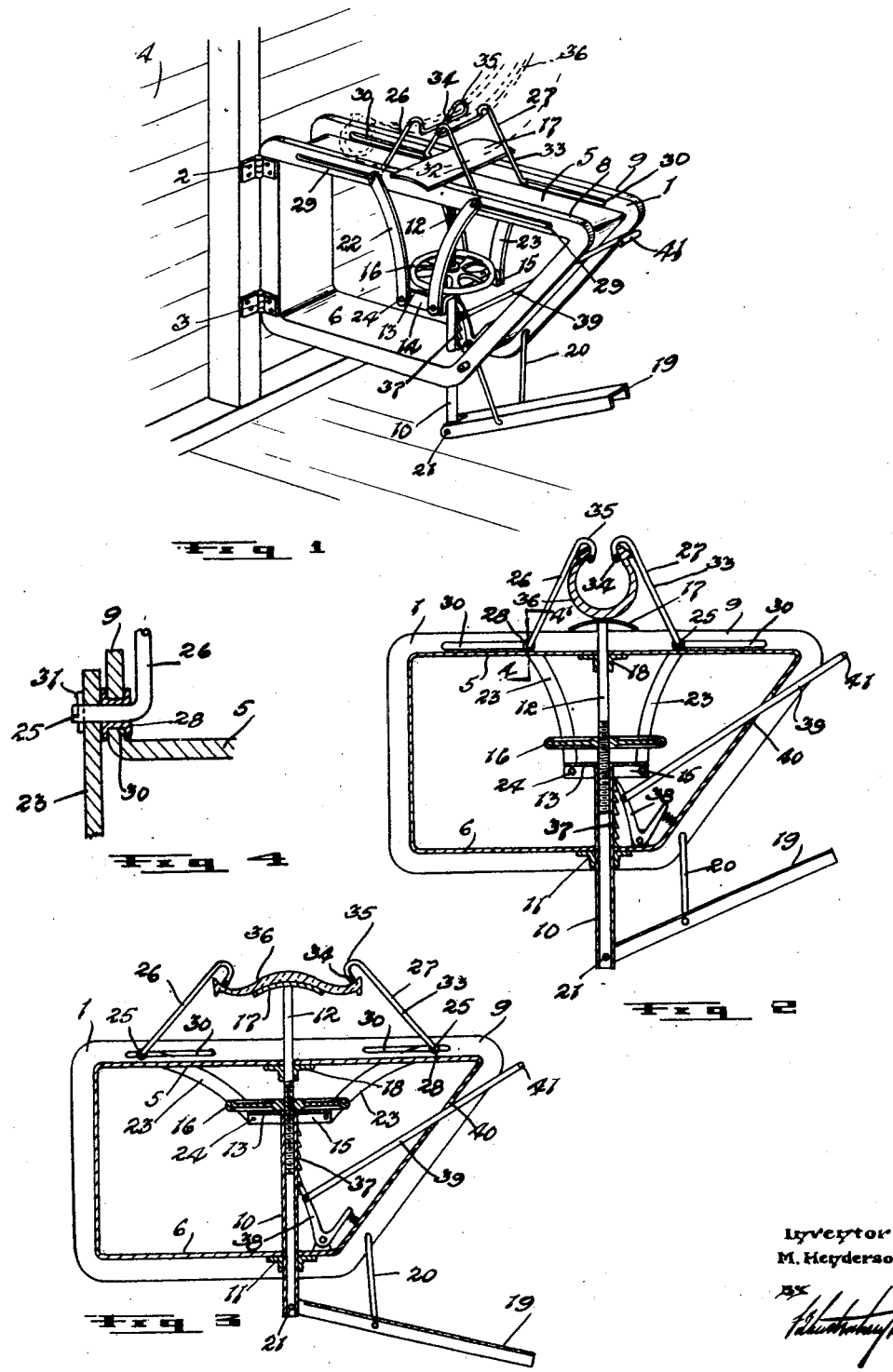
Inventor
M. Henderson Patented Jan. 15, 1929.

1,698,883

UNITED STATES PATENT OFFICE.

MORTON HENDERSON, OF GENTHON, MANITOBA, CANADA.

TIRE-WORKING TOOL.

Application filed March 28, 1927. Serial No. 179,165.

The invention relates to improvements in tire working tools and an object of the invention is to provide a tool whereby an automobile, truck or such like pneumatic tire can be easily and quickly opened up in order to easily and quickly locate any damaged part of the tire such as a hole, cut, bruise and so forth and which is arranged such that after such damaged part is located, the tire can be locked in its open position to permit of the ready repairing of the same.

A further object is to construct the appliance in a simple, cheap and durable manner and such that the operator has his hands entirely free in order to manipulate the tire or do other work.

A further object of the invention is to construct the device so that it can be used to open various sizes of tires and such that it can be adjusted to accommodate the tire on which it is to be used.

With the above more important objects in view, the invention consists essentially in the arrangement and construction of parts hereinafter more particularly described, reference being had to the accompanying drawing, in which:—

Fig. 1 is a perspective view of the device, part of the tire being shown in dotted outline.

Fig. 2 is a vertical sectional view centrally through the device and showing the tire in the closed position.

Fig. 3 is a view similar to Figure 2 and showing the tire in the open position.

Fig. 4 is an enlarged detailed vertical sectional view at 4—4' Figure 2.

In the drawing like characters of reference indicate corresponding parts in the several figures.

The body 1 of the tool is herein shown as in the form of an open frame made from a piece of channel iron bent to the shape shown and having the ends thereof suitably welded together. This frame or body is suspended in any suitable manner from a stationary support and is herein shown as fastened by hinges 2 and 3 to the wall 4 of a building, the arrangement permitting the tool to be swung parallel to the building when not in use. Obviously the tool could be similarly suspended from a bench or other desired place.

The channel iron provides upper and lower parallel spaced plates 5 and 6 and side flanges 8 and 9 at the edges of the plates which amply reinforce the same and are also used for other purposes as later apparent. A tubular shaft or pipe 10 passes vertically slidably through a suitable bearing 11 provided in the plate 6 and in the upper end of the tube I slidably mount the lower screw threaded end of a vertical shaft 12 in the form of a jack screw. The upper end of the tubular shaft carries a head 13 which is permanently fastened thereto and is in the form of a substantially rectangular, horizontally disposed plate having the ends thereof down turned to provide end flanges 14 and 15.

A hand wheel 16 is adjustably mounted on the lower screw threaded end of the shaft 12. The upper end of the shaft 12 carries a substantially rectangular upwardly arched pressure plate 17 which is permanently fastened thereto and the said shaft passes slidably through a bearing 18 carried by the plate 5. A foot lever or pedal 19 is pivotally mounted on a stirrup 20 carried by the flanges of the frame and the lower end of the pedal is forked to span the lower end of the tube 10 to which it is attached pivotally by a pin 21.

According to this arrangement, it will be obvious that one stepping on the outer end of the pedal will cause the tube 10 to rise and the plate 13 by contact with the hand wheel will effect the raising of the shaft 12 an amount as regulated by the adjustment of the hand wheel. Here I might explain that the down position of the shaft 12 is controlled by the plate 17 engaging the flanges 8 and 9.

The head 13 carries pairs of links 22 and 23, the links having their lower ends pivotally attached at 24 to the flanges 14 and 15 and their upper ends pivotally mounted on out turned spindles 25 formed at the ends of similar grab hooks 26 and 27. The spindles carry rollers 28 which operate in pairs of horizontal slots 29 and 30 formed in the flanges 8 and 9. The links are retained on the spindles by pins 31. Obviously when the rollers are at the inner ends of the slots as best shown in Figures 1 and 2, the links will be suspending the plate 13 and consequently the shaft 10 in its lowermost position.

The grab hooks 26 and 27 are similarly constructed and are herein shown as formed each from a length of stiff wire bent into an open sided rectangular shape to provide side arms 32 and 33, the lower ends of which are out turned to provide the spindles 25 and the upper ends of which are connected by a cross arm 34, there being parallel semi-circular bends 35 made in the wire at the points where the arms join. In this way, I form grab hooks of a convenient shape to catch the edges or beads of the usual automobile tire.

When it is desired to open a tire 36, the tire is placed on the plate 17 in the manner shown in the drawing, the plate 17 being down and the outer end of the pedal 19 being up. The grab hooks are then caught over the edges or beads of the tire as shown best in Figure 2. One then presses down on the outer end of the foot pedal and this initially causes the plate 13 to move up, the upper ends of the links 22 and 23 to move out and the grab hooks to initially pull the edges of the tire apart.

Shortly after this initial movement has occurred, the plate 13 strikes the previously adjusted hand wheel and in the following up movement of the tubular shaft 10 causes the shaft 12 to be raised and consequently the plate 17. The relative movements above explained cause the tire to be opened out into the position as shown in Figure 3 where it will be apparent that any damaged part can be readily found by inspection. As soon as the foot pressure is removed from the pedal, the parts return to their normal position under the action of gravity and accordingly by pressing and then releasing the foot pedal a number of times and simultaneously rotating the tire, one can inspect the whole interior of the tire if necessary, the inspection continuing until a damaged part is found. When this is found, one can hold the pedal down whilst subsequent work is being done. As this, however, might be undesirable, I have provided a means for locking the parts in their up position and whilst such means is herein described in detail, I wish it to be distinctly understood that any suitable means could be employed for the purpose.

I provide the front side of the tubular shaft 10 with a series of ratchet teeth 37 and I attach pivotally to the plate 6 a spring pressed dog 38, the dog being designed to automatically lock the tubular shaft 10 in any up pressed position. A release rod 39 is attached pivotally to the dog and passes outwardly through a suitable hole 40 formed in the frame and terminates in a hand grip 41 which is within convenient range of the operator. According to this arrangement, when the parts have been brought into the position shown in Figure 3, one can release his foot from the foot pedal and the parts are automatically locked by the dog and the work of repairing the tire can be proceeded with. When it is desired to release the tire, one simply pulls on the hand grip 41 to withdraw the dog and the parts can be returned to their normal position as shown in Figures 1 and 2.

It is desirable to have the grab hooks initially pull the tire edges apart before the plate 17 moves up and the lead which the grab hooks are so given over the plate 17 is determined by the hand wheel which can be adjusted as desired so that the plate 13 will strike the hand wheel sooner or later as wished. The device is designed such that when the rollers are at the inner ends of the slots, the grab hooks will accommodate the largest tires met with.

When a smaller tire is encountered, one will screw up the hand wheel and this allows the tubular shaft 10 to be initially raised an amount which will permit the grab hooks to effectively catch the edges of the tire and at such time, the rollers will have moved out a short distance in the slots. When the grab hooks are caught properly on the edges of the smaller tire, the hand wheel will be above the plate 13 so that in the further down pressing of the pedal, the grab hooks will initially move out in the same manner as previously disclosed before the plate 17 starts travelling upwardly.

What I claim as my invention is:—

1. In a tire working tool, in combination, a supporting frame, a vertically adjustable and guided shiftable plate carried by the frame and having a limited lower position, a pair of shiftable grab hooks carried by the frame and engageable with the edges of the tire and means for raising the plate and shifting the grab hooks to open the tire.

2. In a tire working tool, in combination, a supporting frame, a vertically guided shiftable plate carried by the frame and having a limited lower position, a pair of shiftable grab hooks carried by the frame and engageable with the edges of the tire, means for raising the plate and shifting the grab hooks to open the tire, the said grab hooks being given an initial out movement prior to the up movement of the plate.

3. In a tire working tool, in combination, a supporting frame, a vertically disposed upper shaft slidably carried by the frame and having the upper end thereof provided with a head normally engaging the frame and supporting the tire applied thereon, a tubular shaft slidably receiving the lower end of the former shaft and slidably carried by the frame, manually operated means for raising the tubular shaft, adjustable means carried by the upper shaft and engageable with the upper end of the tubular shaft, grab hooks guided by the frame and engageable with the edges of the tire and operating connections between the tubular shaft and the grab hooks and adapted to out shift the grab hooks in the up movement of said tubular shaft.

4. In a tire working tool, in combination, a supporting frame, a vertically disposed upper shaft slidably carried by the frame and having the upper end thereof provided with a head normally engaging the frame and supporting the tire applied thereon, a tubular shaft slidably receiving the lower end of the former shaft and slidably carried by the frame, manually operated means for raising the tubular shaft, adjustable means carried by the upper shaft and engageable with the upper end of the tubular shaft, grab hooks guided by the frame and engageable with the edges of the tire, operating connections between the tubular shaft and the grab hooks and adapted to out shift the grab hooks in the up movement of said tubular shaft and means for releasably locking the tubular shaft in any up shifted position.

5. A tire working tool comprising, in combination, a supporting frame, an upper vertically disposed shaft slidably carried by the frame and having the lower end thereof screw threaded, a pressure plate secured to the upper end of the shaft and overlying and normally engaging with the frame, a vertically disposed tubular shaft slidably receiving the lower end of the upper shaft and slidably carried by the frame and extending there below, manually operated means for lifting the tubular shaft, a hand wheel adjustably mounted on the screw threaded end of the upper shaft and overlying the upper end of the tubular shaft, a pair of grab hooks having their upper ends engageable with the edges of the tire mounted on the pressure plate and their lower ends slidably attached to the frame for outward and inward travel and operating links connecting the lower ends of the grab hooks with the upper end of the tubular shaft.

6. A tire working tool comprising, in combination, a supporting frame, an upper vertically disposed shaft slidably carried by the frame and having the lower end thereof screw threaded, a pressure plate secured to the upper end of the shaft and overlying and normally engaging with the frame, a vertically disposed tubular shaft slidably receiving the lower end of the upper shaft and slidably carried by the frame and extending there below, manually operated means for lifting the tubular shaft, a hand wheel adjustably mounted on the screw threaded end of the upper shaft and overlying the upper end of the tubular shaft, means releasably locking the tubular shaft in any shifted position, a pair of grab hooks having their upper ends engageable with the edges of the tire mounted on the pressure plate and their lower ends slidably attached to the frame for outward and inward travel and operating links connecting the lower ends of the grab hooks with the upper end of the tubular shaft.

7. A tire working tool comprising, in combination, a suitably mounted supporting frame presenting spaced upper and lower horizontally disposed plates, the upper plates being provided with upstanding side flanges, a vertically disposed upper shaft passing through and slidably carried by the upper plate and having the lower end thereof screw threaded, a vertically disposed tubular shaft slidably receiving the lower end of the upper shaft and slidably carried by the lower plate and passing downwardly there beyond, a pivoted foot pedal carried by the frame and pivotally attached to the lower end of the tubular shaft, a pressure plate secured to the upper end of the upper shaft and normally overlying and engaging with the flanges of the top plate and adapted to receive and support the tire, a head plate secured to the upper end of the tubular shaft, a pair of grab hooks having their upper ends shaped to receive and hold the edges of the tire and their lower ends slidably attached to the flanges of the top plate and movable outwardly and inwardly, pairs of links pivotally connecting the lower ends of the grab hooks to the head plate, a hand wheel rotatably mounted on the screw threaded end of the upper shaft and positioned above the head plate, a series of ratchet teeth formed on one side of the tubular shaft and a hand operated spring pressed dog normally engaging the teeth.

Signed at Winnipeg this 4th day of March, 1927.

MORTON HENDERSON.